United States Patent
Zhao et al.

(10) Patent No.: US 10,019,102 B2
(45) Date of Patent: Jul. 10, 2018

(54) TOUCH SCREEN AND TERMINAL

(71) Applicant: ZTE Corporation, Shenzhen (CN)

(72) Inventors: Jiali Zhao, Shenzhen (CN); Weiping Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 50 days.

(21) Appl. No.: 15/036,659

(22) PCT Filed: Apr. 29, 2014

(86) PCT No.: PCT/CN2014/076525
§ 371 (c)(1),
(2) Date: May 13, 2016

(87) PCT Pub. No.: WO2014/183559
PCT Pub. Date: Nov. 20, 2014

(65) Prior Publication Data
US 2016/0283024 A1 Sep. 29, 2016

(30) Foreign Application Priority Data

Nov. 14, 2013 (CN) .......................... 2013 1 0567984

(51) Int. Cl.
G06F 3/041 (2006.01)
G06F 3/043 (2006.01)
G06F 3/0354 (2013.01)

(52) U.S. Cl.
CPC ........ G06F 3/0416 (2013.01); G06F 3/03547 (2013.01); G06F 3/043 (2013.01); G06F 3/0412 (2013.01); G06F 2203/04103 (2013.01)

(58) Field of Classification Search
CPC ....... G06F 2203/04103; G06F 3/03547; G06F 3/043; G06F 3/0416; G06F 3/0412
See application file for complete search history.

(56) References Cited

U.S. PATENT DOCUMENTS 5,691,959 A 11/1997 Kriewall
8,659,579 B2 * 2/2014 Nadjar .................... G06F 3/043
345/177

(Continued)

FOREIGN PATENT DOCUMENTS

CN 101916153 A 12/2010
CN 101968700 A 2/2011

(Continued)

OTHER PUBLICATIONS

International Search Report in international application No. PCT/CN2014/076525, dated Apr. 29, 2014.

(Continued)

*Primary Examiner* — Abhishek Sarma
(74) *Attorney, Agent, or Firm* — Oppedahl Patent Law Firm LLC

(57) ABSTRACT

A touch screen and a terminal are disclosed. The touch screen comprises: a touch panel, at least three pick-up devices, and a data calculation module, whereof: the touch panel covers the pick-up devices and is used to provide a touch operation platform; the pick-up devices are used to detect effective sound signals produced by touch operations, and to record detection time; and the data calculation module is used to ascertain, on the basis of recorded detection times, the time differential of the effective sound signal detected by each pick-up device, and to calculate the position of a touch-point by using the time differential and the path differential from a touch-point to each pick-up device.

9 Claims, 2 Drawing Sheets

(56) References Cited

U.S. PATENT DOCUMENTS

| | | |
|---|---|---|
| 2009/0294186 A1 | 12/2009 | Fontanella |
| 2011/0025649 A1 | 2/2011 | Sheikhzadeh Nadjar |
| 2013/0229273 A1 | 9/2013 | Nodar Cortizo |

FOREIGN PATENT DOCUMENTS

| | | |
|---|---|---|
| CN | 101976158 A | 2/2011 |
| CN | 102495700 A | 6/2012 |
| CN | 102597937 A | 7/2012 |
| CN | 102799320 A | 11/2012 |
| CN | 103221899 A | 7/2013 |
| JP | H0384617 A | 4/1991 |

OTHER PUBLICATIONS

English Translation of the Written Opinion of the International Search Authority in international application No. PCT/CN2014/076525, dated Aug. 29, 2014.
Supplementary European Search Report in European application No. 14798512.1, dated Oct. 7, 2016.

* cited by examiner

TOUCH SCREEN AND TERMINAL

TECHNICAL FIELD

The disclosure relates to the technical field of communication, and in particular to a touch screen and a terminal.

BACKGROUND

Doctor Samuel Hurst invented a touch sensor in 1971, and the sensor is a prototype of a touch screen. He designed the first transparent touch screen three years later. A touch screen technology was greatly improved in 1977, and it is still widely used and rapidly developed till now.

Introduction of a touch screen to mobile handheld equipment subverts a definition of a mobile handheld equipment user about the product. As latest input equipment, it is the simplest and most convenient and natural human-computer interaction manner at present. It endows multimedia with new appearance, and is extraordinarily attractive brand-new multimedia interaction equipment.

At present, there are mainly two types of touch screens used for intelligent mobile phones, i.e. a resistive touch screen and a capacitive touch screen. A capacitive touch screen is superior to a resistive screen in terms of accuracy, sensitivity, multi-touch feasibility, damage resistance, cost and the like, so that capacitive touch screens dominate the touch screen world for intelligent mobile phones.

However, a capacitive touch screen with multiple advantages also has insurmountable shortcomings, such as problems of non-operability for touch with a glove, high drift rate, high cost and the like. Therefore, how to research and develop a touch screen capable of solving the problems becomes a hot research at present.

SUMMARY

The disclosure provides a touch screen and a terminal, which are configured to solve the problem of limited operation of an existing touch screen technology.

According to one aspect of the disclosure, a touch screen is provided, which may include: a touchpad, at least three pickups and a data calculation module, in which:

the touchpad may cover the pickups, and may be configured to provide a touch operation platform;

the pickups may be configured to pick up an effective sound signal generated by a touch operation, and record a pickup time; and the data calculation module may be configured to calculate effective sound signal pickup time differences of each pickup on the basis of the recorded pickup time, and calculate a position of a touch point where the touch operation is applied by virtue of the time differences and differences between paths from the touch point to each pickup.

In an embodiment, the pickups may be configured to acquire information of a specific frequency generated by the touch operation on the touchpad in advance, and filter received sound signals to pick up the effective sound signal on the basis of the information of the specific frequency.

In an embodiment, the data calculation module may include:

a time difference calculation sub-module, configured to calculate pickup time differences of each pickup relative to pickup $Mic_i$ by taking a pickup time of pickup $Mic_i$ which is the first one that picks up the effective sound signal as a reference time on the is basis of the pickup time recorded by each pickup;

a path difference calculation sub-module, configured to calculate the paths from the touch point to each pickup by taking the position of the touch point as an unknown variable, and calculate path differences of the paths from the touch point to each pickup relative to a path from the touch point to the pickup $Mic_i$ by taking the path from the pickup $Mic_i$ to the touch point as a reference path; and a position calculation sub-module, configured to calculate the position of the touch point on the basis of a directly proportional relationship between the time differences and the path differences.

In an embodiment, the position calculation sub-module may be configured to establish physical identical equations between the pickup time differences and path differences of each pickup and the pickup $Mic_i$ to obtain an equation set with the position of the touch point as the unknown variable by taking a sound propagation speed v as a known variable, and solve the equation set to obtain the position of the touch point.

The embodiment of the disclosure further provides a terminal, which may include: a Central Processing Unit (CPU) and the touch screen according to the disclosure, in which:

the touch screen may be configured to report calculated position information of a touch point to the CPU; and the CPU may be configured to perform a touch control operation according to the received position information of the touch point.

In an embodiment, the data calculation module of the touch screen may be integrated in the CPU.

In an embodiment, the CPU may be connected with each pickup of the touch screen through an Inter-Integrated Circuit (I2C) bus to acquire pickup time information recorded by each pickup.

In an embodiment, each pickup of the touch screen may be deployed in a distributed manner, and is arranged in a non-display area.

The disclosure has beneficial effects as follows.

The touch screen of the disclosure, different from a capacitive or resistive touch screen, picks up sound waves generated by touch operation to determine coordinates of a touch point to implement accurate positioning of the touch point by virtue of a plurality of sound pickups, and such a touch manner breaks a limit of a medium of a touch control terminal, and may support touch control operations of various touch control terminals, so that a user experience is greatly improved; and in addition, the devices adopted by the touch screen of the disclosure are low in cost, so that cost of the touch screen is also greatly reduced.

BRIEF DESCRIPTION OF THE DRAWINGS

In order to describe the technical solutions in embodiments of the disclosure or a conventional art more clearly, drawings required by description about the embodiment or the conventional art will be simply introduced below, the drawings described below are only some embodiments of the disclosure obviously, and for those skilled in the art, other drawings may also be obtained according to these drawings on the premise of no creative work.

DETAILED DESCRIPTION

The technical solutions in the embodiments of the disclosure will be clearly and completely described below with reference to the drawings in the embodiments of the disclosure, and obviously, the described embodiments are not all embodiments but only a part of embodiments of the disclosure. All other embodiments obtained by those skilled in the art on the basis of the embodiments in the disclosure without creative work fall within the scope of protection of the disclosure.

The embodiment of the disclosure provides a touch screen, the touch screen implements accurate judgment of a touch point by virtue of sound waves, and such a touch manner is not required to limit a medium of a touch control terminal, and may support touch control operations of various touch control terminals, so that a user experience is greatly improved.

Figure 1:
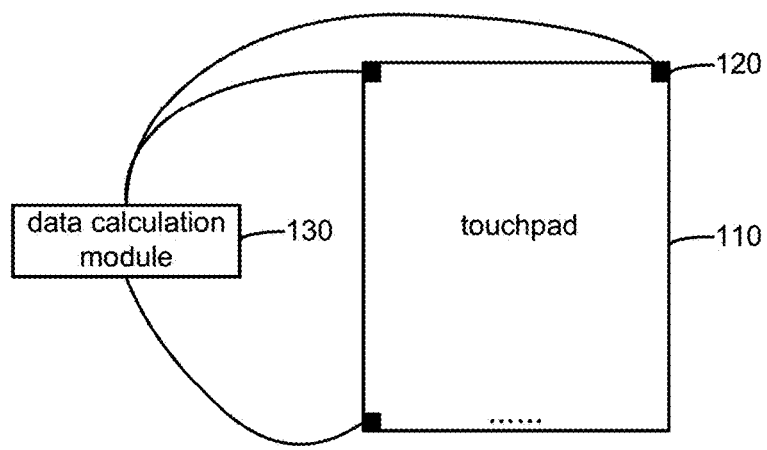
FIG. 1 is a structure diagram of a touch screen according to the disclosure.

As shown in FIG. 1, the touch screen of the embodiment includes: a touchpad 110, at least three pickups 120 and a data calculation module 130, wherein the touchpad 110 covers the pickups 120, and is configured to provide a touch operation platform.

Herein, a material for the touchpad 110 may include, but not limited to impact-resistant and damage-resistant glass.

The touchpad 110 does not need any special function, and is only required to protect a Liquid Crystal Display (LCD) screen of a terminal body with the touch screen of the disclosure without influence on definition.

The pickups 120 are configured to pick up an effective sound signal generated by a touch operation, and record a pickup time.

Herein, the pickups 120 fulfil the aim of picking up the effective sound signal by frequency setting and noise filtering. Exactly, when a user touches the touchpad, sound waves of a specific frequency may be generated, and the frequency corresponding to the sound waves is determined as an effective frequency. The pickups set an effective frequency during work, start a filtering function to filter useless interference sound waves on the basis of such a setting, and only process sound waves, generated by the touch operation, of the specific frequency to further implement pickup of the effective sound signal.

Preferably, there are so many types of pickups at present, the embodiment of the disclosure does not limit types of the pickups, and the pickups are required to meet the following three conditions, specifically: condition 1, the pickups may receive sound signals; condition 2, the pickups may directly or indirectly transmit receiving time of the sound signals to a system; and condition 3, the pickups may calculate frequencies of the received sound signals.

The data calculation module 130 is configured to calculate effective sound signal pickup time differences of each pickup on the basis of the recorded pickup time, and calculate a position of a touch point where the touch operation is applied by virtue of the time differences and differences between paths from the touch point to each pickup.

Preferably, the data calculation module 130 specifically includes:

a time difference calculation sub-module 131, configured to calculate pickup time differences of each pickup relative to a pickup $Mic_i$ by taking the pickup time of the pickup $Mic_i$ which is the first one that picks up the effective sound signal as a reference time on the basis of the pickup time recorded by each pickup;

a path difference calculation sub-module 132, configured to calculate the paths from the touch point to each pickup by taking the position of the touch point as an unknown variable, and calculate path differences of the paths from the touch point to each pickup relative to a path from the touch point to pickup $Mic_i$ by taking the path from the pickup $Mic_i$ to the touch point as a reference path; and a position calculation sub-module 133, configured to calculate the position of the touch point on the basis of a directly proportional relationship between the time differences and the path differences.

Specifically, the position calculation sub-module 133 establishes physical identical equations between the pickup time differences and path differences of each pickup and the pickup $Mic_i$ to obtain an equation set with the position of the touch point as the unknown variable by taking a sound propagation speed v as a known variable, and solve the equation set to obtain the position of the touch point.

Figure 2:
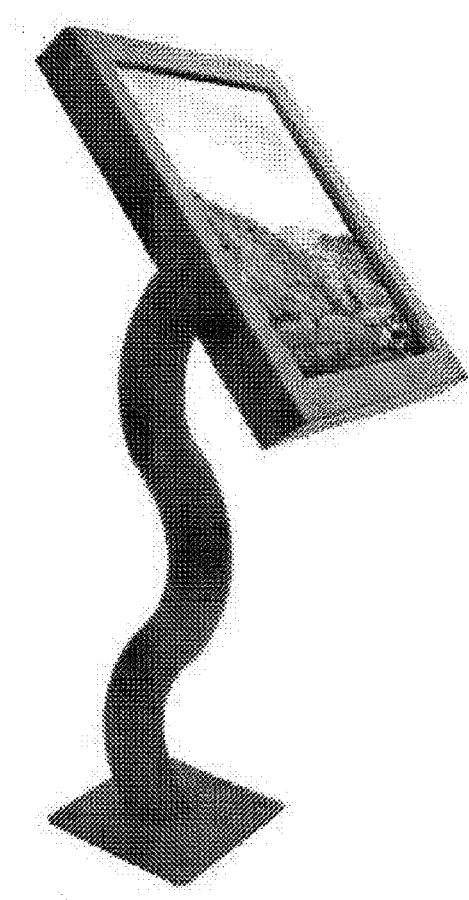
FIG. 2 is a diagram of application of a large-screen display adopting a touch screen of the disclosure.

From the above, it can be screen that a novel touch screen is formed by covering the touchpad on each pickup and matching the data calculation module in the disclosure. The touch screen determines absolute coordinates of the touch point by virtue of sound waves, and ensures accuracy of the touch point by filtering. The touch point is judged by virtue of the sound waves, so that operation with a glove is supported, and a user experience is greatly improved. In addition, a body structure of the touch screen of the disclosure consists of the low-cost pickups and the touchpad without any special requirement, so that manufacturing cost is greatly reduced. Obviously, the touch screen provided by the disclosure is greatly competitive in terms of cost and performance, and the touch screen may be applied to, but not limited to, a low-end intelligent mobile phone and an ultra-large touch display (as shown in FIG. 2), for example: electronic equipment such as a song library for a KTV, a conference desktop and an Automatic Teller Machine (ATM).

Based on the abovementioned implementation process, a specific application to example is given below, the application example discloses more implementation details of the disclosure to elaborate the disclosure more clearly, and the following contents are specifically involved.

Figure 3:
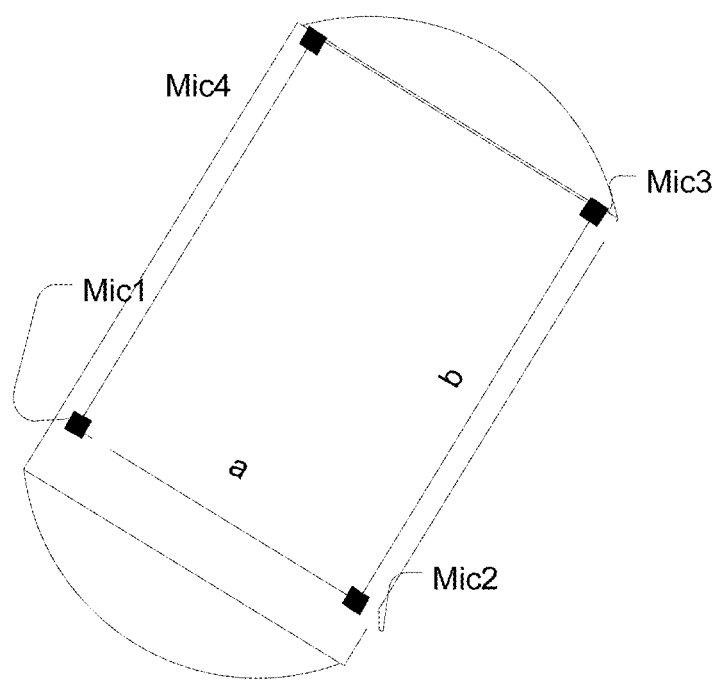
FIG. 3 is a diagram of deployment of pickups according to the disclosure.

1: a touch screen in the application example adopts four pickups to pick up effective sound wave signals, and the four pickups are arranged in four corners of a square touchpad, specifically as shown in FIG. 3.

In the example, a length and width of the touchpad are a and b respectively, a coordinate system is established by taking the left lower corner as a coordinate origin, axis X extends rightwards, and axis Y extends upwards. The four pickups are numbered, and a numbering rule is as follows: the pickup in the left lower corner is numbered to be $Mic_1$, and the other three pickups are sequentially numbered counterclockwise, and are numbered to be $Mic_2$, $Mic_3$ and $Mic_4$ respectively, wherein a distance between $Mic_1$ and $Mic_2$ is a and a distance between $Mic_2$ and $Mic_3$ is b. In the coordinate system, absolute coordinates of the four pickups are (clockwise): (0,0), (0,b), (a,b) and (a,0) respectively.

2: sound signal spectrums picked up by the pickups and generated by touch operation is analyzed in a normal using process of the touchpad, the pickups are set to filter other useless noise, and the four pickups only pick up effective operation sound signals on the touch screen in a practical using process finally.

3: when there is touch operation, each pickup picks up an effective sound signal according to a set frequency, and records pickup time.

4: the four pickups are scanned, it is set that $Mic_1$ is scanned to be the first one that picks up the effective sound signal, relative time $t_1=0$ is recorded, and polling scanning is continued to obtain time differences between sound signal pickup time of the other three pickups and the sound signal pickup time of $Mic_1$, recorded as $\Delta t_{21}$, $\Delta t_{31}$ and $\Delta t_{41}$.

Wherein, $\Delta t_{21}$ represents the sound wave signal pickup time difference between $Mic_2$ and $Mic_1$, $\Delta t_{31}$ represents the sound wave signal pickup time difference between $Mic_3$ and $Mic_1$, and $\Delta t_{41}$ represents the sound wave signal pickup time difference between $Mic_4$ and $Mic_1$.

5: coordinates of a touch point are set to be (x,y), an equation set is established by virtue of known data (sound velocity v, a, b, $\Delta t_{21}$, $\Delta t_{31}$ and $\Delta t_{41}$) and unknown data (x,y), specifically as follows:

$$\begin{cases} \sqrt{(a-x)^2+y^2} - \sqrt{x^2+y^2} = \Delta t_{21} \cdot v \\ \sqrt{(a-x)^2+(b-y)^2} - \sqrt{x^2+y^2} = \Delta t_{31} \cdot v \\ \sqrt{x^2+(b-y)^2} - \sqrt{x^2+y^2} = \Delta t_{41} \cdot v \end{cases}$$

and the equation set is solved to finally calculate the absolute coordinate (x,y) of the touch point.

The embodiment of the disclosure further provides a terminal, which includes: a CPU and the touch screen of the embodiment of the disclosure, wherein the touch screen is configured to report calculated position information of a touch point to the CPU; and the CPU is configured to perform a touch control operation according to the received position information of the touch point.

Additionally, in the embodiment, a data calculation module of the touch screen is integrated in the CPU, and the CPU is connected with each pickup of the touch screen through an I2C bus to acquire pickup time information recorded by each pickup.

In addition, in the embodiment, in order to avoid influence of the pickups in the touch screen on a visual effect of a display screen, each pickup of the touch screen is preferably deployed in a distributed manner, and is arranged in a non-display area, and for example, each pickup is arranged in corners of the display screen.

From the above, the terminal of the embodiment is integrated with any touch screen provided by the disclosure, so that the terminal of the embodiment may also achieve corresponding technical effects. Although having been described before in detail, the effects will not be elaborated herein.

The above is only the preferred embodiment of the disclosure and not intended to limit the scope of protection of the disclosure. It should be understood that those skilled in the art may make corresponding equivalent variations or replacements according to the technical solutions and concept of the disclosure, and all these variations or replacements shall fall within the scope of protection of the appended claims of the disclosure.

What is claimed is:

1. A terminal, comprising: a Central Processing Unit (CPU) and a touch screen, the touch screen, comprising: a touchpad, at least three pickups, and a data calculation module, wherein the data calculation module of the touch screen is integrated in the CPU, and the CPU is connected with each pickup of the touch screen, wherein the touchpad covers the pickups, and is configured to provide a touch operation platform;

wherein the pickups are configured to pick up an effective sound signal generated by a touch operation, and record a pickup time; and wherein the data calculation module is configured to calculate effective sound signal pickup time differences of each pickup on the basis of the recorded pickup time, and calculate a position of a touch point where the touch operation is applied by virtue of the time differences and differences between paths from the touch point to each pickup.

2. The touch screen according to claim 1, wherein the pickups are configured to acquire information of a specific frequency generated by the touch operation on the touchpad in advance, and filter received sound signals to pick up the effective sound signal on the basis of the information of the specific frequency.

3. The touch screen according to claim 1, wherein the data calculation module comprises:

a time difference calculation sub-module, configured to calculate pickup time differences of each pickup relative to a pickup $Mic_i$ by taking a pickup time of the pickup $Mic_i$ which is the first one that picks up the effective sound signal as a reference time on the basis of the pickup time recorded by each pickup;

a path difference calculation sub-module, configured to calculate the paths from the touch point to each pickup by taking the position of the touch point as an unknown variable, and calculate path differences of the paths from the touch point to each pickup relative to a path from the touch point to the pickup $Mic_i$ by taking the path from the pickup $Mic_i$ to the touch point as a reference path; and a position calculation sub-module, configured to calculate the position of the touch point on the basis of a directly proportional relationship between the time differences and the path differences.

4. The touch screen according to claim 3, wherein the position calculation sub-module is configured to establish physical identical equations between the pickup time differences and path differences of each pickup and the pickup $Mic_i$ to obtain an equation set with the position of the touch point as the unknown variable by taking a sound propagation speed v as a known variable, and solve the equation set to obtain the position of the touch point.

5. A terminal, comprising: a Central Processing Unit (CPU) and a touch screen, wherein the terminal and the touch screen are the terminal and the touch screen according claim 1, and the touch screen is configured to report calculated position information of a touch point to the CPU; and the CPU is configured to perform a touch control operation according to the received position information of the touch point.

6. The terminal according to claim 5, wherein the CPU is connected with each pickup of the touch screen through an Inter-Integrated Circuit (I2C) bus to acquire pickup time information recorded by each pickup.

7. The terminal according to claim 5, wherein each pickup of the touch screen is deployed in a distributed manner, and is arranged in a non-display area.

8. The touch screen according to claim 2, wherein the data calculation module comprises:

a time difference calculation sub-module, configured to calculate pickup time differences of each pickup relative to a pickup $Mic_i$ by taking a pickup time of the pickup $Mic_i$ which is the first one that picks up the effective sound signal as a reference time on the basis of the pickup time recorded by each pickup;

a path difference calculation sub-module, configured to calculate the paths from the touch point to each pickup by taking the position of the touch point as an unknown variable, and calculate path differences of the paths from the touch point to each pickup relative to a path from the touch point to the pickup $Mic_i$ by taking the path from the pickup $Mic_i$ to the touch point as a reference path; and a position calculation sub-module, configured to calculate the position of the touch point on the basis of a directly proportional relationship between the time differences and the path differences.

9. The touch screen according to claim 8, wherein the position calculation sub-module is configured to establish physical identical equations between the pickup time differences and path differences of each pickup and the pickup Mici to obtain an equation set with the position of the touch point as the unknown variable by taking a sound propagation speed v as a known variable, and solve the equation set to obtain the position of the touch point.

\* \* \* \* \*